UNITED STATES PATENT OFFICE.

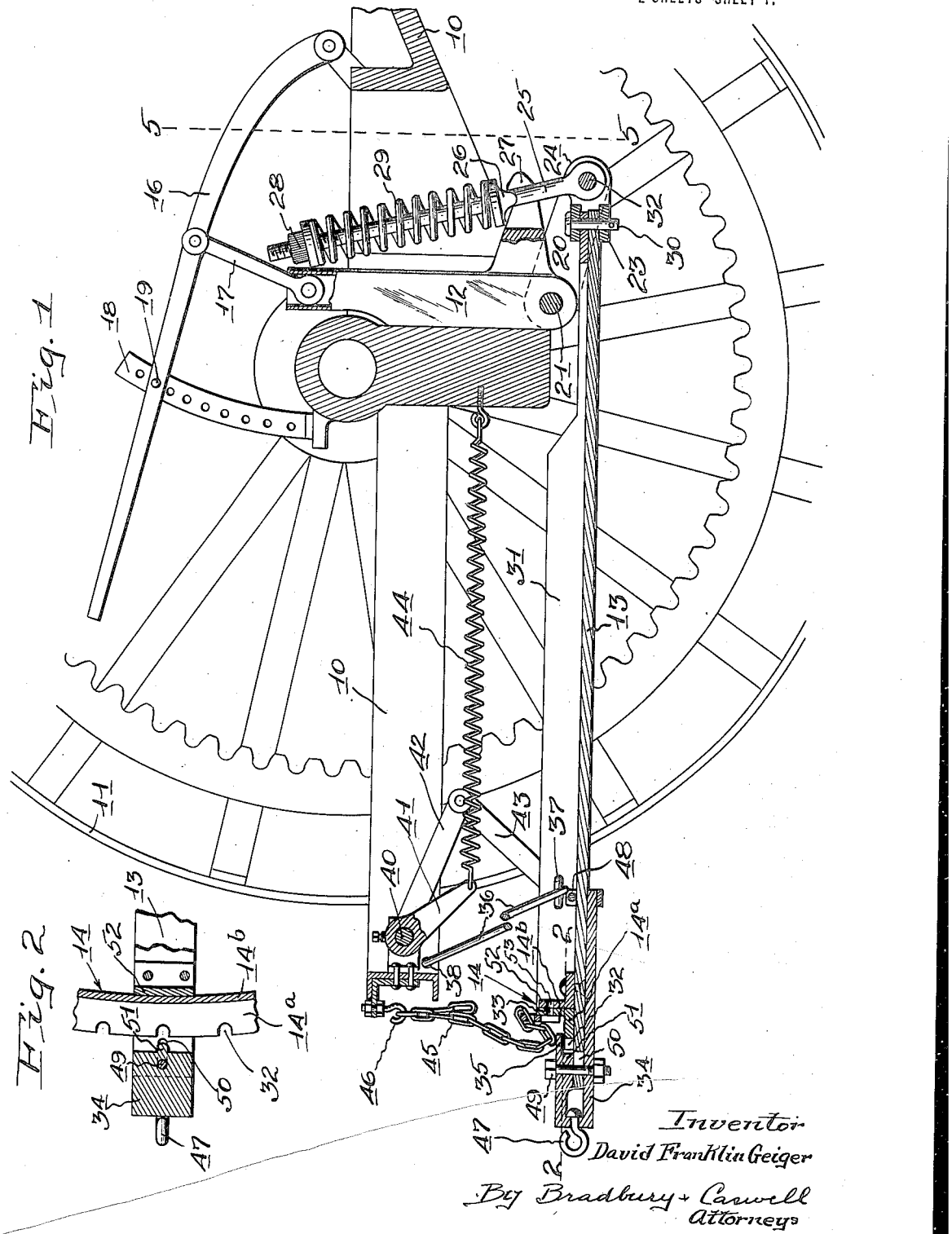
D. F. GEIGER.
HITCH FOR TRACTORS.
APPLICATION FILED AUG. 16, 1920.
1,417,373.
Patented May 23, 1922.
2 SHEETS—SHEET 1.
Inventor
David Franklin Geiger
By Bradbury & Caswell
Attorneys

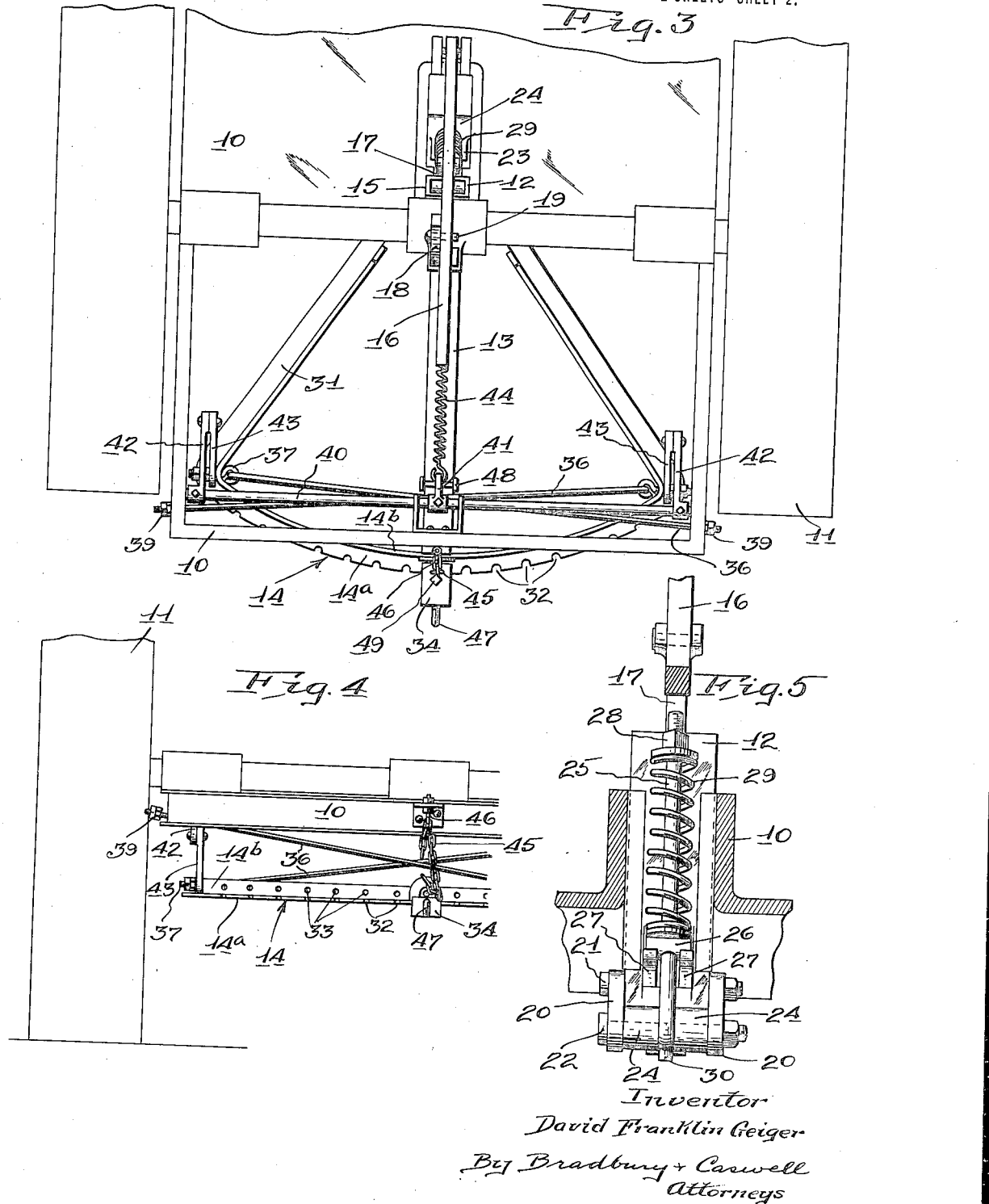

DAVID FRANKLIN GEIGER, OF MINNEAPOLIS, MINNESOTA, ASSIGNOR OF ONE-THIRD TO ARTHUR D. COLE, OF MINNEAPOLIS, MINNESOTA.

HITCH FOR TRACTORS.

1,417,373.  Specification of Letters Patent.  Patented May 23, 1922.

Application filed August 16, 1920. Serial No. 403,896.

*To all whom it may concern:*

Be it known that I, DAVID FRANKLIN GEIGER, a citizen of the United States, residing in Minneapolis, in the county of Hennepin and State of Minnesota, have invented a new and useful Hitch for Tractors, of which the following is a specification.

My invention relates to improvements in hitches for tractors, its object being to provide a simple and durable hitch designed to be carried by a draft vehicle and adapted to supply an efficient coupling means especially for the various types of farm, road and other implements.

A further object is to provide a device of this kind including a draw bar, which is free to swing horizontally, in pulling, but automatically locked against swinging in backing.

Another object is to supply, in a device of this kind, a swinging draw bar and means for locking the same in various angular relations to compensate for side draft in implements coupled to said draw bar.

An additional object is to provide, in a device of this kind, a swinging draw bar and a vertically floating locking quadrant adapted to carry the weight of the free end of said draw bar.

Another object is to furnish, in a hitch of this nature, a draw bar and a vertically adjustable device connecting the draw bar with the draft vehicle.

A further object is to provide novel means for attaching a draw bar to a tractor frame, whereby the point of connection between the draw bar and frame is automatically lowered under extreme pulls, thus counteracting the tendency of the tractor to rear.

With the foregoing and other objects in view, which will appear in the following description, the invention resides in the novel combination and arrangement of parts and in the details of construction hereinafter described and claimed.

In the drawings, Fig. 1 is a central longitudinal sectional view of a device embodying my invention and applied to a tractor; Fig. 2 is a detail sectional view taken on the line 2—2 of Fig. 1; Fig. 3 is a plan view of the device and tractor structure illustrated in Fig. 1; Fig. 4 is a rear view of the same and Fig. 5 is a detail sectional view taken on the line 5—5 of Fig. 1.

Referring to the drawings, I have used the reference numeral 10 to indicate the frame and the numeral 11 to designate the traction wheels of a draft vehicle.

My improved device includes a vertically adjustable post 12 slidably mounted in the frame of the tractor, a draw bar 13 connected at one end with said post and a floating quadrant 14 for supporting and locking the free end of said draw bar. The post 12 fits loosely in a suitable vertical slide 15 in the tractor frame 10. A lever 16, pivoted at its forward end to said frame and connected through a link 17 with the upper end of the post 12, provides for raising and lowering said post to elevate or depress the draw bar connection to suit various conditions. An apertured standard 18, fixed to the frame 10, receives a locking pin 19 in the lever 16 and holds said lever in different positions, thereby securing the post at various elevations. A pair of links 20, pivoted upon a bolt 21 in the post 12, swing longitudinally of the tractor upon opposite sides of said post and carry a bolt 22 in the free ends thereof. These links embrace a clevis 23 and the apertured bosses 24 of said clevis receive said bolt 22. An upwardly extending rod 25 is pivoted on the bolt 22 between said bosses 24. A saddle 26, slidably receiving said rod 25, is mounted on a rest comprising two spaced arms 27 integral with and extending forwardly from said post. The upper end of the rod 25 is threaded to receive a nut 28 and a compression spring 29 is interposed between said nut 28 and saddle 26. The adjustment of this nut increases or diminishes the tension of the spring 29, as desired, and said spring operates, normally, to hold the links 20 forward of the post 12 and in position wherein the free ends of said links are inclined slightly downward. The draw bar 13 is pivoted horizontally on a pin 30 in the clevis 23 and swings sidewise on said pin, while the clevis to which said bar is attached is capable of swinging vertically on the bolt 22. In the normal position of the links 20, just described, the greater part of a load upon the draw bar 13 is transmitted through said links to the post 12, while the lesser force is met by the spring 29 on the rest 26. Under ordinary working conditions said spring is capable of holding the links 20 substantially as shown in Fig. 1. When the load upon the draw bar becomes abnormally great and the resistance of the coupled implement approaches that degree wherein the tractor has a tendency to rear or turn backward over the axis of its traction wheels, the resistance of the spring 29 is overcome, thus permitting the downward inclination of the links 20. This lowering of the free ends of said links, depresses the point of connection between the tractor frame and draw bar, thereby increasing the leverage in the hitch, which leverage opposes rearing movement of the tractor frame. The quadrant 14 is formed from a strip of angle iron, the middle portion being curved and the ends thereof bent inwardly and joined to form arms 31. I pivot these arms at their junction on the pin 30 in the clevis 23. One flange 14$^a$ of the quadrant 14 extends rearwardly and the other flange 14$^b$ extends upwardly, the former having notches 32 therein and the latter being perforated as at 33. A coupler head 34 at the end of the draw bar 13 has a flange 35 overlapping the horizontal flange 14$^a$ of the quadrant 14 and adapted to slidably carry the draw bar. Substantial lateral movements of the quadrant 14 are prevented by crossed stay rods 36, the lower ends of which are caught in eye bolts 37 in the quadrant, while the upper ends of said rods are passed through holes 38 in the tractor frame and fitted at their extremities with stop nuts 39. I provide for yieldingly carrying the quadrant as follows: To a shaft 40, suitably journaled on the tractor frame, are fixed an arm 41 and link members 42. Companion link members 43 connect the free ends of said members 42 with the eye-bolts 37 on the quadrant 14 and a spring 44 stretched between the arm 41 and frame 10 yieldingly holds the shaft 40 so that said link members normally rest in folded relation as shown in Fig. 1. Said spring 44 prevents the quadrant from falling, but yields under slight pressure to permit the lowering thereof. A link chain 45 attached to the quadrant 14 and adjustably connected with a hook 46 on the tractor frame, serves to limit the downward movement of said quadrant. The coupler head 34 is fitted with a swiveled coupling bolt 47 and is slidably attached at its forward end to the draw bar by means of a clip 48. A bolt 49 in said coupler head passes through a slot 50 extending longitudinally in the draw bar 13. This bolt permits a limited sliding movement of the coupler head on said draw bar. A lug 51 on the coupler head clears the notches 32 in the quadrant in pulling a load, but in backing or holding back the load, the coupler is thrust forward and said lug engages one of said notches, thus preventing the buckling of the draw bar. In drawing implements subject to side draft, I lock the draw bar 13 in suitable angular relation on the quadrant 14. A bracket 52 on the draw bar has an aperture 53 therein arranged to register with the apertures 33 in the upright flange 14$^b$ of the quadrant 14. I insert a locking pin (not shown) through registering apertures 33 and 53 and thus secure the draw bar with respect to said quadrant 14.

In use, the lever 16 is adjusted to adapt the hitch to various implements. The spring 29 permits the lowering of the draw bar connection under extreme loads. The floating quadrant 14 keeps the draw bar off the ground, yet permits it to move freely in response to varying conditions in travel. Said quadrant also locks the draw bar against buckling horizontally and provides for securing the same in various angular positions.

Changes in the specific form of my invention, as herein disclosed, may be made within the scope of what is claimed without departing from the spirit of my invention.

Having described my invention, what I claim as new and desire to protect by Letters Patent is:

1. In a device of the class described, the combination with the frame of a draft vehicle, of a draw bar attached at its forward end to said frame and free to swing both vertically and horizontally, a quadrant forming a horizontal slide for the free end of the draw bar and mechanism on the frame for yieldingly supporting the quadrant.

2. In a device of the class described, the combination with the frame of a draft vehicle, of a swinging draw bar pivoted as its forward end to said frame, a vertically floating support carried by said frame and furnishing a lateral slide for the free end of the draw bar and means for automatically locking the draw bar on the support, in backing or holding back a coupled implement.

3. In a device of the class described, the combination with the frame of a draft vehicle, of a draw bar attached at its forward end to said frame and free to swing both vertically and horizontally, a quadrant forming a horizontal slide for the free end of the draw bar, mechanism on the frame for yieldingly supporting the quadrant and an adjustable stop to limit the downward movement of the quadrant.

4. In a device of the class described, the combination with the frame of a draft vehicle, of a swinging draw bar pivoted at its forward end to said frame, a vertically floating support carried by said frame and furnishing a lateral slide for the free end of the draw bar and means for manually locking the draw bar on the support in various angular positions.

5. In a device of the class described, the combination with the frame of a draft vehicle, of a draw bar beneath said frame, a notched quadrant having forwardly extending arms thereon, means for attaching said arms and the forward end of the draw bar to the frame, a coupler head on the draw bar, said head being slidable laterally on the quadrant and having a limited slidable connection with the draw bar, a lug on said coupler head designed to engage in a notch in said quadrant, in backing or holding back a coupled vehicle, crossed stay rods between the quadrant and frame designed to permit substantial movements of the quadrant in vertical directions only, a shaft on the frame, spaced pairs of folding links, one link of each pair being fixed to said shaft and the other link pivoted to said quadrant, an arm on the shaft and a spring stretched between said arm and frame adapted to counteract, through said arm, shaft and links, the weight of said quadrant and draw bar.

6. In a device of the class described the combination with the frame of a draft vehicle of a draw bar beneath said frame, an apertured quadrant having forwardly extending arms thereon, means for attaching said arms and the forward end of the draw bar to the frame, a coupler head on the draw bar, said head being slidable laterally on the quadrant, a bracket on the draw bar having an aperture therein arranged to register with the apertures in the quadrant, a locking pin designed to pass through said registering apertures and adapted to secure the draw bar with respect to the quadrant, crossed stay rods between the quadrant and frame designed to permit substantial movements of the quadrant in vertical directions only, a shaft on the frame, spaced pairs of folding links, one link of each pair being fixed to said shaft and the other link pivoted to said quadrant, an arm on the shaft and a spring stretched between said arm and frame adapted to counteract, through said arm, shaft and links, the weight of said quadrant and draw bar.

7. In a device of the class described, the combination with a draft vehicle, of a swinging draw bar pivotally attached at its forward end to the frame of the vehicle, a vertically floating notched quadrant carrying the free end of the draw bar, a coupler head on said free end of said draw bar having a limited slidable connection therewith, a lug on said coupler head, said lug being removed from the notches in said quadrant, in pulling, but engaged with one of said notches in backing.

8. In a device of the class described, the combination with the frame of the draft vehicle, of a swinging draw bar pivotally attached at its forward end to the frame, a vertically floating support forming a lateral slide for the free end of the draw bar and means for locking the draw bar on said support in various angular positions.

9. In a device of the class described, the combination with the frame of a draft vehicle, of a draw bar and means connecting said draw bar with said frame, said connecting means yielding and automatically lowering the point of connection between the frame and draw bar, under abnormal pulls upon the latter.

10. In a device of the class described, the combination with the frame of a draft vehicle, of a post adjustable vertically in said frame, a draw bar beneath the frame, a downwardly inclinable link joining said draw bar with said post and yielding means for normally holding said link substantially horizontal and forward of said post.

11. In a device of the class described, the combination with the frame of a draft vehicle, of a post on said frame, means for adjusting said post vertically, a draw bar beneath the frame, a downwardly inclinable link pivotally connected at one end with said post and at its other end with the draw bar, a rest on said post, a rod attached to the free end of said link, a saddle slidable on the rod and mounted on said rest, a nut threaded on said rod and a compression spring interposed between said saddle and nut, said spring being designed to normally hold the link in substantially horizontal position forward of said support and adapted to permit said link to swing downwardly under abnormal strains on the draw bar, whereby the connection between the draw bar and frame is lowered.

12. In a device of the class described, the combination with the frame of a draft vehicle, of a draw bar, a vertically adjustable connection joining the forward end of said draw bar with the frame and a vertically floating element furnishing a horizontal supporting slide for the other end of the draw bar.

In testimony whereof, I have signed my name to this specification.

DAVID FRANKLIN GEIGER.